(12) United States Patent
Iida et al.

(10) Patent No.: US 11,632,032 B2
(45) Date of Patent: Apr. 18, 2023

(54) POWER CONVERTER WITH OUTPUT MISCONNECTION DETERMINER

(71) Applicants: FUJI ELECTRIC CO., LTD., Kawasaki (JP); HONDA MOTOR CO., LTD., Tokyo (JP)

(72) Inventors: Takashi Iida, Suzuka (JP); Mitsuteru Yano, Tokyo (JP)

(73) Assignees: FUJI ELECTRIC CO., LTD., Kawasaki (JP); HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 17/218,982

(22) Filed: Mar. 31, 2021

(65) Prior Publication Data
US 2021/0328494 A1 Oct. 21, 2021

(30) Foreign Application Priority Data
Apr. 17, 2020 (JP) .............................. JP2020-074311

(51) Int. Cl.
*H02J 3/38* (2006.01)
*H02M 1/00* (2006.01)
*H02J 7/00* (2006.01)
*H02J 3/00* (2006.01)

(52) U.S. Cl.
CPC ......... *H02M 1/0009* (2021.05); *H02J 3/0012* (2020.01); *H02J 7/00304* (2020.01); *H02J 7/00711* (2020.01); *H02J 2310/12* (2020.01); *H02J 2310/48* (2020.01)

(58) Field of Classification Search
CPC .............. H02J 2310/12; H02J 2310/48; H02J 7/00711; H02J 7/00304; H02J 3/0012; H02M 1/0009
See application file for complete search history.

(56) References Cited

U.S. PATENT DOCUMENTS

| | | | |
|---|---|---|---|
| 2015/0092464 A1 | 4/2015 | Uehira et al. | |
| 2015/0349530 A1* | 12/2015 | Meredith | H02J 3/381 307/51 |
| 2018/0166875 A1* | 6/2018 | Oldham, Jr. | H02H 3/20 |
| 2020/0406771 A1 | 12/2020 | Okumura | |
| 2021/0013796 A1 | 1/2021 | Amimoto et al. | |

FOREIGN PATENT DOCUMENTS

| | | |
|---|---|---|
| JP | 2018-170921 A | 11/2018 |
| JP | 6552769 B1 | 7/2019 |
| WO | 2013/190951 A1 | 12/2013 |
| WO | 2019/211929 A1 | 11/2019 |

OTHER PUBLICATIONS

Japan Patent Office, "Office Action for Japanese Patent Application 2020-074311," dated Jun. 7, 2022.

* cited by examiner

*Primary Examiner* — Harry R Behm
(74) *Attorney, Agent, or Firm* — Manabu Kanesaka

(57) ABSTRACT

A power converter includes a power conversion controller configured to determine whether or not an output terminal is misconnected to a system power supply based on a current between a power converter and the output terminal and a voltage between the power converter and the output terminal, and to perform a control to stop power conversion in the power converter when determining that the output terminal is misconnected to the system power supply.

7 Claims, 5 Drawing Sheets

POWER CONVERTER WITH OUTPUT MISCONNECTION DETERMINER

CROSS-REFERENCE TO RELATED APPLICATION

The present application claims priority of Japanese Patent Application No. 2020-074311 filed Apr. 17, 2020, the disclosure of which is hereby incorporated by reference.

BACKGROUND OF THE INVENTION

Field of the Invention

The present invention relates to a power converter, and more particularly, it relates to a power converter capable of supplying power from a DC power supply to a load in a house.

Description of the Background Art

A power converter capable of supplying power from a DC power supply to a load in a house is known in general, as disclosed in Japanese Patent No. 6552769, for example.

Japanese Patent No. 6552769 discloses an electric vehicle charger/discharger including a charge/discharge unit (power converter) that is a power conversion circuit. In the electric vehicle charger/discharger described in Japanese Patent No. 6552769, the charge/discharge unit converts AC power supplied from a system power supply via a distribution board into DC power and supplies the DC power to a storage battery (DC power supply) of an electric vehicle. Furthermore, the charge/discharge unit converts the DC power supplied from the storage battery of the electric vehicle into AC power and supplies the AC power to a load in a house via the distribution board.

Although not clearly described in Japanese Patent No. 6552769, wiring inside the distribution board as described in Japanese Patent No. 6552769 may be accidentally reconnected by a user of the electric vehicle as described in Japanese Patent No. 6552769. In this case, when the DC power supplied from the storage battery (DC power supply) of the electric vehicle is converted into AC power and supplied to the load in the house via the distribution board, a terminal (output terminal) of the charge/discharge unit (power converter) on the distribution board side may be misconnected to the system power supply due to accidental reconnection of the wiring by the user. In this case, a component such as a switching element included in the power converter may be damaged due to overcurrent flowing through the charge/discharge unit.

SUMMARY OF THE INVENTION

The present invention has been proposed in order to solve the aforementioned problem, and an object of the present invention is to provide a power converter capable of significantly reducing or preventing damage to a switching element etc. of a power converter due to misconnection to a system power supply.

In order to attain the aforementioned object, a power converter according to an aspect of the present invention is configured to supply power from a DC power supply to a load in a house, and includes a power converter including a plurality of switching elements, the power converter converting DC power input from the DC power supply and outputting AC power, a voltage detector that detects a voltage between the power converter and an output terminal, a current detector that detects a current between the power converter and the output terminal, and a power conversion controller configured to control power conversion in the power converter based on the voltage detected by the voltage detector and the current detected by the current detector. The power conversion controller is configured to determine whether or not the output terminal is misconnected to a system power supply based on the current detected by the current detector and the voltage detected by the voltage detector, and to perform a control to stop the power conversion in the power converter when determining that the output terminal is misconnected to the system power supply.

In the power converter according to this aspect of the present invention, as described above, the power conversion controller configured to control the power conversion in the power converter is configured to determine whether or not the output terminal is misconnected to the system power supply based on the current between the power converter and the output terminal and the voltage between the power converter and the output terminal. When the voltage output from the power converter is controlled to be reduced by controlling the power conversion controller such that that the current output from the power converter is reduced, for example, the voltage between the power converter and the output terminal drops with the voltage output from the power converter unless the output terminal is misconnected to the system power supply. That is, when the voltage output from the power converter is changed based on the current between the power converter and the output terminal, the output terminal is conceivably misconnected to the system power supply unless the voltage between the power converter and the output terminal drops to a desired value or less. Therefore, with the configuration described above, the power conversion controller can determine whether or not the output terminal is misconnected to the system power supply. Furthermore, in the aforementioned power converter according to this aspect, as described above, the power conversion controller configured to control the power conversion in the power converter is configured to perform a control to stop the power conversion in the power converter when determining that the output terminal is misconnected to the system power supply. Accordingly, when it is determined that the output terminal is misconnected to the system power supply, the power conversion in the power converter (the operation of the power converter) can be stopped, and thus the possibility that a state in which the output terminal is misconnected to the system power supply and an overcurrent flows through the power converter is maintained can be significantly reduced or prevented. Consequently, damage to the switching elements etc. of the power converter due to misconnection to the system power supply can be significantly reduced or prevented.

In the aforementioned power converter according to this aspect, the power conversion controller preferably includes an overcurrent detector that detects that the current detected by the current detector is in an overcurrent state, a misconnection determiner that determines whether or not the output terminal is misconnected to the system power supply based on the overcurrent state detected by the overcurrent detector and the voltage detected by the voltage detector, and a PWM signal generator that generates and outputs a PWM signal to control the power conversion in the power converter. The PWM signal generator preferably stops outputting the PWM signal when the misconnection determiner determines that the output terminal is misconnected to the system power supply. Accordingly, the power conversion controller can easily determine whether or not the output terminal is misconnected to the system power supply by the misconnection determiner, and can easily stop the operation of the power converter by stopping outputting the PWM signal in the PWM signal generator. Consequently, the possibility that a state in which the output terminal is misconnected to the system power supply and an overcurrent flows through the power converter is maintained can be easily significantly reduced or prevented.

In this case, the misconnection determiner preferably determines that the output terminal is misconnected to the system power supply when the overcurrent state repeatedly occurs for a plurality of times during a predetermined period, and when the voltage detected by the voltage detector continues to be higher than a predetermined first voltage threshold over the predetermined period. When the voltage output from the power converter is controlled to be reduced by controlling the PWM signal generator such that that the current output from the power converter is reduced in the overcurrent state, the voltage between the power converter and the output terminal drops with the voltage output from the power converter unless the output terminal is misconnected to the system power supply. That is, when the voltage output from the power converter is dropped based on the current between the power converter and the output terminal, the output terminal is conceivably misconnected to the system power supply unless the voltage between the power converter and the output terminal drops to a desired value or less. Therefore, with the configuration described above, the power conversion controller can reliably determine whether or not the output terminal is misconnected to the system power supply.

In the aforementioned configuration in which the misconnection determiner determines that the output terminal is misconnected to the system power supply when the overcurrent state repeatedly occurs for the plurality of times during the predetermined period, the overcurrent detector preferably outputs overcurrent information indicating the overcurrent state to the misconnection determiner and the PWM signal generator when the current detected by the current detector is equal to or higher than a predetermined current threshold, and the PWM signal generator preferably temporarily stops outputting the PWM signal when an output of the PWM signal is not stopped, and when the overcurrent information is input thereto from the overcurrent detector. Accordingly, the misconnection determiner can easily acquire information indicating that the overcurrent state has been detected by the overcurrent detector by the overcurrent information indicating the overcurrent state input thereto. Furthermore, the PWM signal generator temporarily stops outputting the PWM signal when the overcurrent information is input thereto such that the power conversion controller can restart the operation of the power converter unlike a case in which the PWM signal generator continuously stops outputting the PWM signal when the overcurrent information is input thereto from the overcurrent detector.

In this case, the PWM signal generator preferably restarts the output of the PWM signal when the overcurrent information is no longer input thereto from the overcurrent detector. Accordingly, the power conversion controller can reliably restart the operation of the power converter when an overcurrent momentarily occurs, and thus stopping of the power converter due to the momentary overcurrent can be significantly reduced or prevented.

In the aforementioned power converter according to this aspect, the power conversion controller is preferably configured to determine that the output terminal is misconnected to the system power supply when the voltage detected by the voltage detector is equal to or higher than a predetermined second voltage threshold before controlling the power conversion in the power converter. Accordingly, the power conversion controller can determine whether or not the output terminal is misconnected to the system power supply before operating the power converter. Consequently, unlike a case in which the power conversion controller operates the power converter and determines whether or not the output terminal is misconnected to the system power supply, no overcurrent flows through the power converter, and thus damage to the switching elements etc. of the power converter due to misconnection to the system power supply can be prevented.

In the aforementioned power converter according to this aspect, the power converter preferably outputs single-phase AC power via three lines including a first voltage line, a second voltage line, and a neutral line, the current detector preferably detects a current in the first voltage line and a current in the second voltage line between the power converter and the output terminal, and the power converter preferably further includes a current calculator that calculates a current in the neutral line based on the current in the first voltage line and the current in the second voltage line. Accordingly, the current in the neutral line can be calculated by the current calculator without providing a detection circuit that detects the current in the neutral line, and thus as compared with a case in which a detection circuit is provided for each of the three lines in the current detector, the number of components can be reduced, and the device configuration can be simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The configuration of a power converter 100 according to a first embodiment of the present invention is now described with reference to FIGS. 1 to 5.

Figure 1:
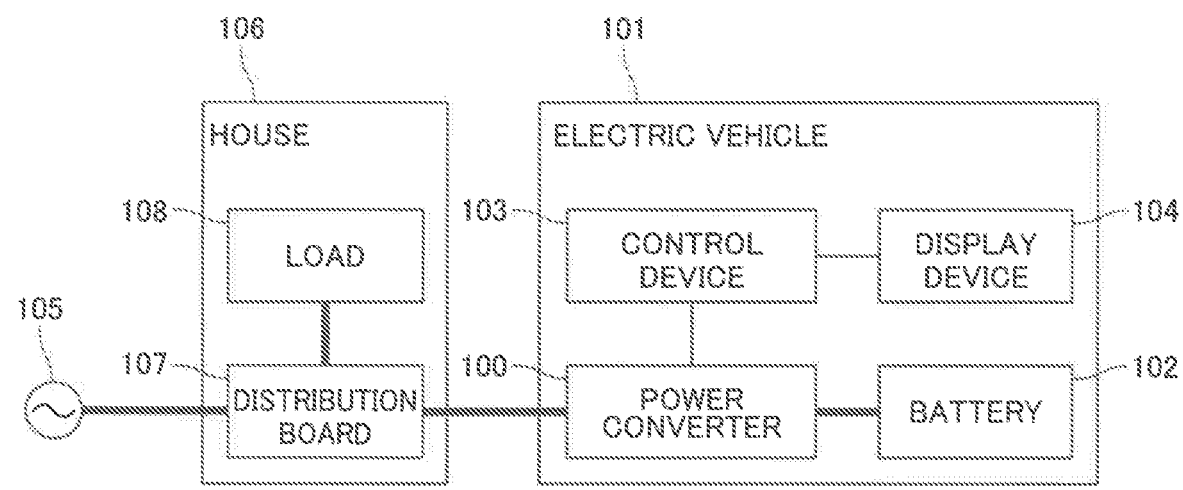
FIG. 1 is a diagram showing the overall configuration of a power network to which a power converter is connected according to a first embodiment of the present invention.

As shown in FIG. 1, the power converter 100 is mounted on an electric vehicle 101. That is, the power converter 100 is an in-vehicle power converter. In addition to the power converter 100, a battery 102, a control device 103, a display device 104, etc. are mounted on the electric vehicle 101. The battery 102 is an example of a "DC power supply" in the claims.

The battery 102 includes a storage battery capable of charging power. The storage battery is a lithium-ion secondary battery, for example. That is, the battery 102 is a distributed power supply independent of a system power supply 105. The electric vehicle 101 runs by driving an electric motor (not shown) with the power charged in the battery 102.

The control device 103 is configured to control each portion of the electric vehicle 101. The control device 103 includes a plurality of electronic control units (ECUs).

The display device 104 displays information on each portion of the electric vehicle 101 based on control by the control device 103. The display device 104 is a liquid crystal display, for example. The display device 104 may be a touch panel type liquid crystal display.

The power converter 100 is a power converter capable of bi-directionally converting power between the input terminal 15 (see FIG. 2) side and the output terminal 16 (see FIG. 2) side. Specifically, the power converter 100 can convert AC power supplied from the system power supply 105 via a distribution board 107 provided in a house 106 into DC power and supply the DC power to the battery 102 (charge the battery 102). Furthermore, the power converter 100 can convert the DC power supplied from the battery 102 into AC power and supply the AC power to a load 108 in the house 106 via the distribution board 107 (supply power from the battery 102). That is, the power converter 100 is a power converter capable of supplying power from the battery 102 to the load 108 in the house 106.

The configuration and operation of the power converter 100 in a case in which the AC power supplied from the system power supply 105 is converted into DC power and supplied to the battery 102 are described below.

Figure 2:
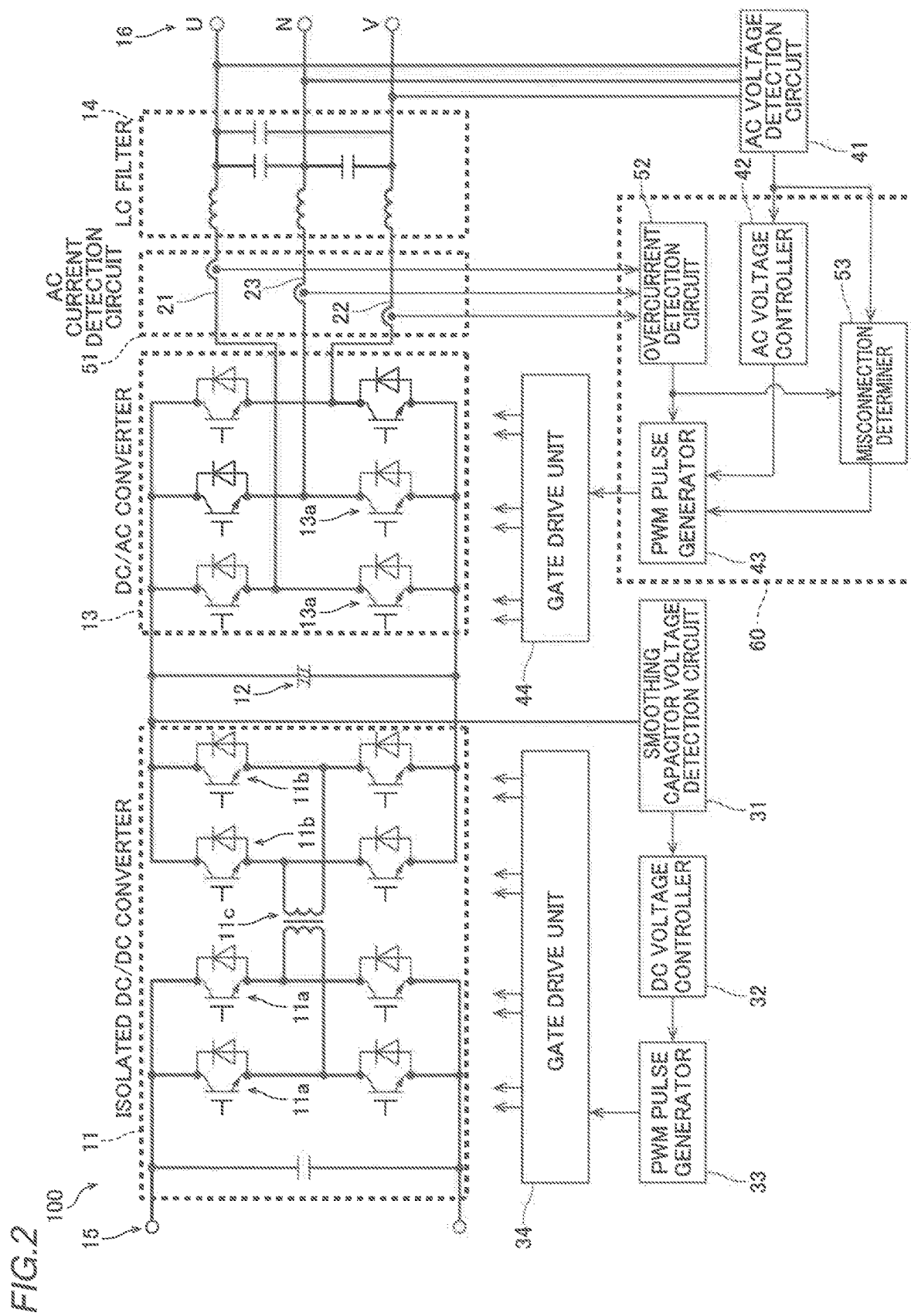
FIG. 2 is a diagram showing the overall configuration of the power converter according to the first embodiment of the present invention.

As shown in FIG. 2, the power converter 100 includes an isolated DC/DC converter 11, a smoothing capacitor 12, a DC/AC converter 13, and an LC filter 14. The isolated DC/DC converter 11, the smoothing capacitor 12, the DC/AC converter 13, and the LC filter 14 are electrically connected in this order from the input terminal 15 side connected to the battery 102 toward the output terminal 16 side connected to the distribution board 107. The DC/AC converter 13 is an example of a "power converter" in the claims.

The isolated DC/DC converter 11 includes a plurality of switching elements 11a, a plurality of switching elements 11b, and an isolation transformer 11c. The plurality of switching elements 11a, the isolation transformer 11c, and the plurality of switching elements 11b are arranged in this order from the input terminal 15 side toward the output terminal 16 side. The plurality of switching elements 11a and the plurality of switching elements 11b are PWM (pulse width modulation)-controlled such that the isolated DC/DC converter 11 performs power conversion. The plurality of switching elements 11a and the plurality of switching elements 11b are insulated gate bipolar transistors (IGBTs), for example. The isolation transformer 11c isolates a primary winding on the side of the plurality of switching elements 11a from a secondary winding on the side of the plurality of switching elements 11b. In FIG. 2, the plurality of switching elements 11a and the plurality of switching elements 11b are shown as IGBTs.

The isolated DC/DC converter 11 converts a direct current input from the input terminal 15 side into an alternating current by the plurality of switching elements 11a, converts the alternating current into a direct current by the plurality of switching elements 11b after the alternating current passes through the isolation transformer 11c, and outputs the direct current to the smoothing capacitor 12 side.

The DC/AC converter 13 includes a plurality of switching elements 13a. The plurality of switching elements 13a is PWM-controlled such that the DC/AC converter 13 performs power conversion. The plurality of switching elements 13a is IGBTs, for example. In FIG. 2, the plurality of switching elements 13a is shown as IGBTs.

The DC/AC converter 13 converts the DC power input from the smoothing capacitor 12 side into AC power and outputs an alternating current to an output terminal 16 via the LC filter 14 in a power supply mode. That is, the DC/AC converter 13 converts the DC power input from the battery 102 and outputs the AC power.

The DC/AC converter 13 is a single-phase three-wire DC/AC converter. That is, the DC/AC converter 13 outputs single-phase AC power via three lines including a first voltage line 21 (U phase), a second voltage line 22 (V phase), and a neutral line 23 (N phase).

The power converter 100 includes a smoothing capacitor voltage detection circuit 31, a DC voltage controller 32, a PWM pulse generator 33, and a gate drive unit 34 in order to control the isolated DC/DC converter 11.

The smoothing capacitor voltage detection circuit 31 detects the voltage of the direct current between the isolated DC/DC converter 11 and the smoothing capacitor 12 (hereinafter referred to as a "smoothing capacitor voltage"). The smoothing capacitor voltage detection circuit 31 outputs the detected voltage to the DC voltage controller 32.

The DC voltage controller 32 is configured to control the smoothing capacitor voltage to be constant. Specifically, the DC voltage controller 32 includes a PI regulator configured to perform a PI control. The DC voltage controller 32 uses the PI regulator to generate an isolated DC/DC converter output command based on a difference between the indicated value of the smoothing capacitor voltage and the output of the smoothing capacitor voltage detection circuit 31. Then, the DC voltage controller 32 outputs the generated isolated DC/DC converter output command to the PWM pulse generator 33.

The PWM pulse generator 33 generates a PWM pulse based on the isolated DC/DC converter output command input from the DC voltage controller 32. The PWM pulse generator 33 outputs the generated PWM pulse to the gate drive unit 34. The PWM pulse is an example of a "PWM signal" in the claims.

The gate drive unit 34 generates a gate pulse used to control the plurality of switching elements 11a and the plurality of switching elements 11b of the isolated DC/DC converter 11 based on the PWM pulse input from the PWM pulse generator 33. The gate drive unit 34 inputs the generated gate pulse to the isolated DC/DC converter 11. Then, the isolated DC/DC converter 11 operates (turns on/off) the plurality of switching elements 11a and the plurality of switching elements 11b based on the input gate pulse.

The power converter 100 includes an AC voltage detection circuit 41, an AC voltage controller 42, a PWM pulse generator 43, and a gate drive unit 44 in order to control the DC/AC converter 13. The AC voltage detection circuit 41 and the PWM pulse generator 43 are examples of a "voltage detector" and a "PWM signal generator" in the claims, respectively.

The AC voltage detection circuit 41 is provided between the LC filter 14 and the output terminal 16. The AC voltage detection circuit 41 detects the voltage of the alternating current that flows between the DC/AC converter 13 and the output terminal 16 (hereinafter referred to as an "AC voltage"). The AC voltage detection circuit 41 outputs the detected AC voltage to the AC voltage controller 42.

The AC voltage controller 42 is configured to control the effective value of the AC voltage to be constant. Specifically, the AC voltage controller 42 includes a PI regulator to perform a PI control. The AC voltage controller 42 uses the PI regulator to generate a DC/AC converter output command based on a difference between the indicated value of the AC voltage and the AC voltage calculated from the output of the AC voltage detection circuit 41. Then, the AC voltage controller 42 outputs the generated DC/AC converter output command to the PWM pulse generator 43.

The PWM pulse generator 43 generates a PWM pulse based on the DC/AC converter output command input from the AC voltage controller 42. The PWM pulse generator 43 outputs the generated PWM pulse to the gate drive unit 44. That is, the PWM pulse generator 43 generates a PWM pulse to control a voltage output from the DC/AC converter 13 based on the AC voltage detected by the AC voltage detection circuit 41.

The gate drive unit 44 generates a gate pulse used to control the switching elements 13a of the DC/AC converter 13 based on the PWM pulse input from the PWM pulse generator 43. The gate drive unit 44 inputs the generated gate pulse to the DC/AC converter 13. Then, the DC/AC converter 13 operates (turns on/off) the plurality of switching elements 13a based on the input gate pulse.

The power converter 100 also includes an AC current detection circuit 51 and an overcurrent detection circuit 52. The AC current detection circuit 51 and the overcurrent detection circuit 52 are examples of a "current detector" and an "overcurrent detector" in the claims, respectively.

The AC current detection circuit 51 is provided between the DC/AC converter 13 and the LC filter 14. The AC current detection circuit 51 detects a current between the DC/AC converter 13 and the output terminal 16 (hereinafter referred to as an "AC current"). The AC current detection circuit 51 detects an AC current in the first voltage line 21 (U phase), an AC current in the second voltage line 22 (V phase), and an AC current in the neutral line 23 (N phase) (AC currents in the three lines). The AC current detection circuit 51 outputs the detected AC currents in the three lines to the overcurrent detection circuit 52.

The overcurrent detection circuit 52 detects that the AC current detected by the AC current detection circuit 51 is in an overcurrent state. That is, the overcurrent detection circuit 52 detects whether or not the AC current detected by the AC current detection circuit 51 is equal to or higher than a current threshold. The overcurrent detection circuit 52 includes a wind comparator, for example. The overcurrent detection circuit 52 outputs an overcurrent flag indicating that the AC current is in the overcurrent state to the PWM pulse generator 43 when the AC current detected by the AC current detection circuit 51 is equal to or higher than the current threshold. The current threshold is set to a value at which components (such as the switching elements 13a) of the DC/AC converter 13 can be protected. The overcurrent flag is an example of "overcurrent information" in the claims.

The PWM pulse generator 43 stops the output of the PWM pulse when the overcurrent flag is input from the overcurrent detection circuit 52. The PWM pulse generator 43 restarts the stopped output of the PWM pulse when the overcurrent flag is no longer input from the overcurrent detection circuit 52. That is, the PWM pulse generator 43 generates a PWM pulse to control the voltage output from the DC/AC converter 13 based on the AC current detected by the AC current detection circuit 51.

The PWM pulse generator 43 may restart the stopped output of the PWM pulse when the output of the PWM pulse is stopped, and when the overcurrent flag is no longer input from the overcurrent detection circuit 52. The PWM pulse generator 43 may restart the stopped output of the PWM pulse when the overcurrent flag is no longer input from the overcurrent detection circuit 52 at the timing of the next and subsequent PWM pulse generation or output. Stopping of the output of the PWM pulse in a case in which the stopped output of the PWM pulse is restarted may be temporary between the timing of the current PWM pulse generation or output and the timing of the next and subsequent PWM pulse generation or output, for example.

Figure 3:
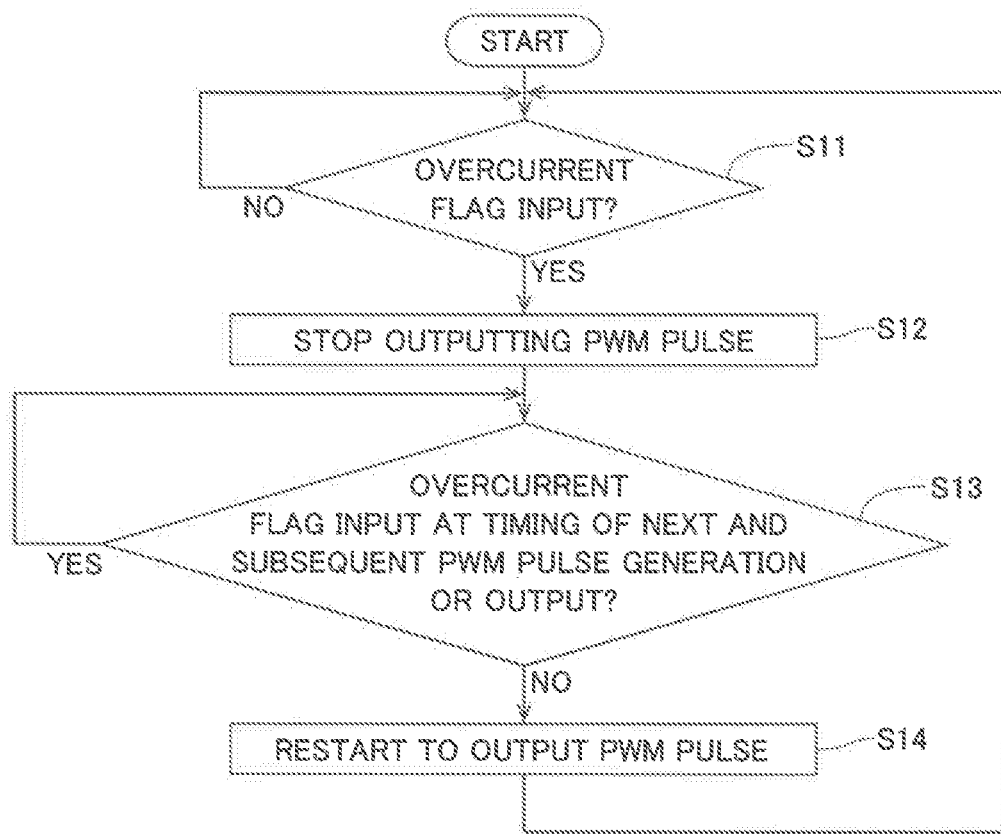
FIG. 3 is a control flow of a PWM generator for a PWM signal in the power converter according to the first embodiment of the present invention.

Specifically, as shown in FIG. 3, first, the PWM pulse generator 43 determines whether or not the overcurrent flag has been input while generating and outputting the PWM pulse (step S11). The operation in step S11 is repeated until the PWM pulse generator 43 determines that the overcurrent flag has been input. Then, when determining that the overcurrent flag has been input in step S11, the PWM pulse generator 43 stops generating and outputting the PWM pulse (step S12). Then, the PWM pulse generator 43 determines whether or not the overcurrent flag has been input at the timing of the next and subsequent PWM pulse generation or output (step S13). The operation in step S13 is repeated until the PWM pulse generator 43 determines that the overcurrent flag has not been input at the timing of the next and subsequent PWM pulse generation or output. Then, when determining that the overcurrent flag has not been input at the timing of the next and subsequent PWM pulse generation or output, the PWM pulse generator 43 restarts to generate and output the PWM pulse.

In the power converter 100, when an overcurrent flows as the AC current, the output of the PWM pulse is adjusted (the output of the PWM pulse is stopped) such that the alternating-current voltage (AC voltage) output from the DC/AC converter 13 is dropped. In a normal state (a state in which the output terminal 16 is connected to the load 108 in the house 106), the AC current drops as the AC voltage drops, and thus the overcurrent state ends.

As shown in FIG. 2, the power converter 100 includes a power conversion controller 60 including the AC voltage controller 42, the PWM pulse generator 43, and the overcurrent detection circuit 52 as components. That is, the power conversion controller 60 is configured to control power conversion in the DC/AC converter 13 based on the AC voltage detected by the AC voltage detection circuit 41 and the AC current detected by the AC current detection circuit 51. The power conversion controller 60 is a microcontroller, for example.

As shown in FIG. 2, in the first embodiment, the power conversion controller 60 is configured to determine whether or not the output terminal 16 is misconnected to the system power supply 105 based on the AC current and the AC voltage, and to perform a control to stop power conversion in the DC/AC converter 13 when determining that the output terminal 16 is misconnected to the system power supply 105.

Specifically, the power conversion controller 60 includes a misconnection determiner 53 that determines whether or not the output terminal 16 is misconnected to the system power supply 105 based on the overcurrent state detected by the overcurrent detection circuit 52 and the voltage detected by the AC voltage detection circuit 41. The misconnection determiner 53 determines that the output terminal 16 is misconnected to the system power supply 105 when the overcurrent state repeatedly occurs for a plurality of times during a predetermined period, and when the AC voltage (effective value) continues to be higher than a predetermined first voltage threshold over the predetermined period. The first voltage threshold may be a voltage value at which a constant voltage defined by the power converter 100 can be maintained, for example, but is not limited to this. The PWM pulse generator 43 stops outputting the PWM pulse when the misconnection determiner 53 determines that the output terminal 16 is misconnected to the system power supply 105.

Figure 4:
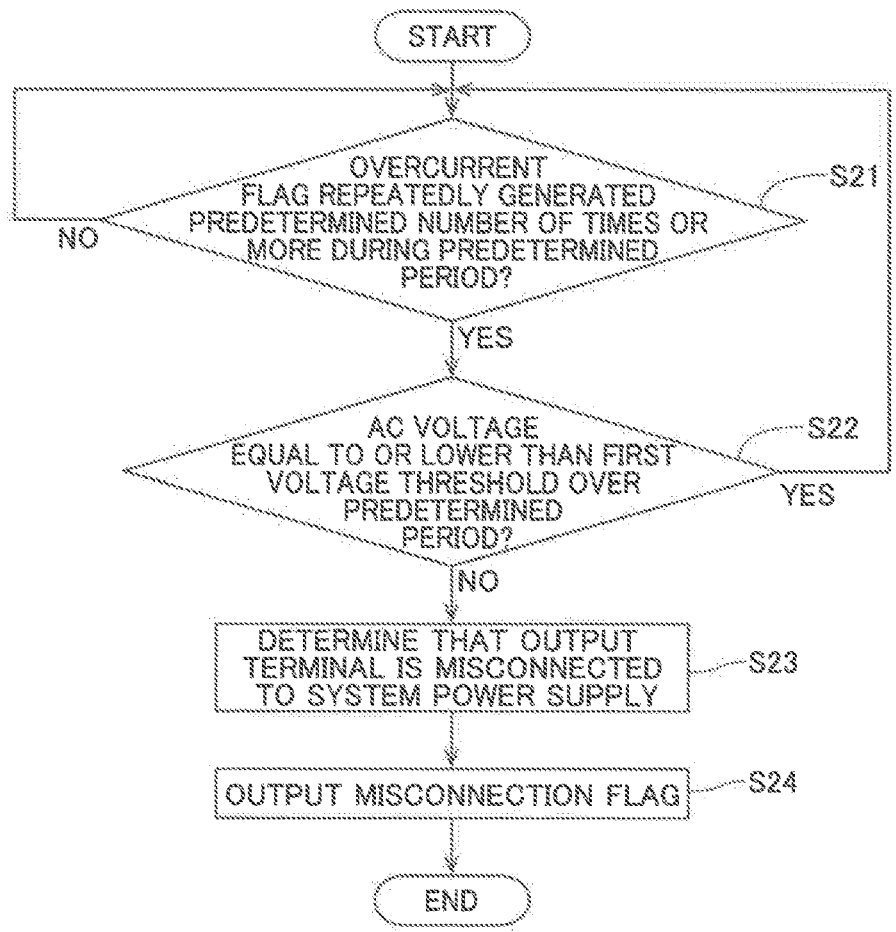
FIG. 4 is a control flow of a misconnection determiner of the power converter according to the first embodiment of the present invention.

More specifically, the overcurrent flag is input from the overcurrent detection circuit 52 to the misconnection determiner 53. Furthermore, the AC voltage is input from the AC voltage detection circuit 41 to the misconnection determiner 53. As shown in FIG. 4, the misconnection determiner 53 determines whether or not the overcurrent flag has been repeatedly generated for a predetermined number of times or more during the predetermined period (step S21). The operation in step S21 is repeated until the misconnection determiner 53 determines that the overcurrent flag has been repeatedly generated for the predetermined number of times or more during the predetermined period. When determining that the overcurrent flag has been repeatedly generated for the predetermined number of times or more during the predetermined period in step S21, the misconnection determiner 53 determines whether or not the AC voltage (effective value) is equal to or lower than the first voltage threshold over the predetermined period (step S22). When determining that the AC voltage (effective value) is equal to or lower than the first voltage threshold over the predetermined period in step S22, the misconnection determiner 53 returns to the process operation in step S21. When determining that the AC voltage (effective value) is not equal to or lower than the first voltage threshold over the predetermined period in step S22, the misconnection determiner 53 determines that the output terminal 16 is misconnected to the system power supply 105 (step S23). The operations in step S21 to step S23 are performed concurrently with the process operations in step S11 to step S14 described above.

When the voltage output from the DC/AC converter 13 is controlled to be reduced by controlling the PWM pulse generator 43 (stopping generating and outputting the PWM pulse) such that that the AC current output from the DC/AC converter 13 is reduced in the overcurrent state, the AC voltage (effective value) drops with the voltage output from the DC/AC converter 13 unless the output terminal 16 is misconnected to the system power supply 105. That is, when the voltage output from the DC/AC converter 13 is dropped based on the AC current, the output terminal 16 is conceivably misconnected to the system power supply 105 unless the AC voltage (effective value) drops to the first voltage threshold or less. Therefore, the misconnection determiner 53 can determine whether or not the output terminal 16 is misconnected to the system power supply 105 by the method described above.

Figure 5:
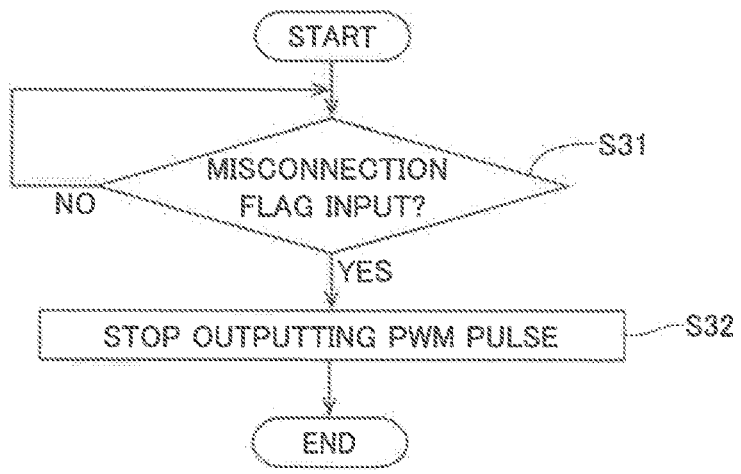
FIG. 5 is a control flow different from that shown in FIG. 3 of the PWM generator of the power converter according to the first embodiment of the present invention.

When determining that the output terminal 16 is misconnected to the system power supply 105 in step S23, the misconnection determiner 53 outputs a misconnection flag to the PWM pulse generator 43 (step S24). As shown in FIG. 5, the PWM pulse generator 43 determines whether or not the misconnection flag has been input (step S31). The operation in step S31 is repeated until the PWM pulse generator 43 determines that the misconnection flag has been input. When determining that the misconnection flag has been input in step S31, the PWM pulse generator 43 stops outputting the PWM pulse.

With the configuration described above, the power converter 100 can determine whether or not the output terminal 16 is misconnected to the system power supply 105 while the DC/AC converter 13 is operating.

In the first embodiment, the power conversion controller 60 is configured to determine that the output terminal 16 is misconnected to the system power supply 105 when the voltage detected by the AC voltage detection circuit 41 is equal to or higher than a predetermined second voltage threshold before controlling power conversion in the DC/AC converter 13. Specifically, the misconnection determiner 53 determines that the output terminal 16 is misconnected to the system power supply 105 when the AC voltage between the DC/AC converter 13 and the output terminal 16 is equal to or higher than the second voltage threshold before the PWM pulse generator 43 generates the PWM pulse. That is, the power converter 100 can determine whether or not the output terminal 16 is misconnected to the system power supply 105 while the DC/AC converter 13 is not operating. In the power converter 100, the second voltage threshold may be substantially the same as the first voltage threshold, but is not limited to this.

In the power converter 100, the misconnection determiner 53 outputs, to the control device 103, the misconnection flag indicating that the output terminal 16 is misconnected to the system power supply 105 when determining that the output terminal 16 is misconnected to the system power supply 105. Specifically, as shown in FIG. 4, when determining that the output terminal 16 is misconnected to the system power supply 105 in step S23, the misconnection determiner 53 outputs the misconnection flag to the control device 103 in addition to the PWM pulse generator 43. Then, the control device 103 controls the display device 104 to display information indicating that the output terminal 16 is misconnected to the system power supply 105 based on the misconnection flag input from the misconnection determiner 53.

(Advantageous Effects of First Embodiment)

According to the first embodiment, the following advantageous effects are achieved.

According to the first embodiment, as described above, the power conversion controller 60 configured to control power conversion in the DC/AC converter 13 is configured to determine whether or not the output terminal 16 is misconnected to the system power supply 105 based on the current between the DC/AC converter 13 and the output terminal 16 and the voltage between the DC/AC converter 13 and the output terminal 16. Accordingly, the power conversion controller 60 can determine whether or not the output terminal 16 is misconnected to the system power supply 105. Furthermore, according to the first embodiment, as described above, the power conversion controller 60 configured to control power conversion in the DC/AC converter 13 is configured to perform a control to stop power conversion in the DC/AC converter 13 when determining that the output terminal 16 is misconnected to the system power supply 105. Accordingly, when it is determined that the output terminal 16 is misconnected to the system power supply 105, power conversion in the DC/AC converter 13 (the operation of the DC/AC converter 13) can be stopped, and thus the possibility that a state in which the output terminal 16 is misconnected to the system power supply 105 and an overcurrent flows through the DC/AC converter 13 is maintained can be significantly reduced or prevented. Consequently, damage to the switching elements 13a etc. of the DC/AC converter 13 due to misconnection to the system power supply 105 can be significantly reduced or prevented.

According to the first embodiment, as described above, the power conversion controller 60 includes the overcurrent detection circuit 52 that detects that the current detected by the AC current detection circuit 51 is in the overcurrent state, the misconnection determiner 53 that determines whether or not the output terminal 16 is misconnected to the system power supply 105 based on the overcurrent state detected by the overcurrent detection circuit 52 and the voltage detected by the AC voltage detection circuit 41, and the PWM pulse generator 43 that generates and outputs the PWM pulse to control power conversion in the DC/AC converter 13. Furthermore, the PWM pulse generator 43 stops outputting the PWM pulse when the misconnection determiner 53 determines that the output terminal 16 is misconnected to the system power supply 105. Accordingly, the power conversion controller 60 can easily determine whether or not the output terminal 16 is misconnected to the system power supply 105 by the misconnection determiner 53, and can stop the operation of the DC/AC converter 13 by stopping outputting the PWM pulse in the PWM pulse generator 43. Consequently, the possibility that a state in which the output terminal 16 is misconnected to the system power supply 105 and an overcurrent flows through the DC/AC converter 13 is maintained can be easily significantly reduced or prevented.

According to the first embodiment, as described above, the misconnection determiner 53 determines that the output terminal 16 is misconnected to the system power supply 105 when the overcurrent state repeatedly occurs for a plurality of times during the predetermined period, and when the AC voltage detected by the AC voltage detection circuit 41 continues to be higher than the predetermined first voltage threshold over the predetermined period. Accordingly, the power conversion controller 60 can reliably determine whether or not the output terminal 16 is misconnected to the system power supply 105.

According to the first embodiment, as described above, the overcurrent detection circuit 52 outputs the overcurrent flag indicating the overcurrent state to the misconnection determiner 53 and the PWM pulse generator 43 when the current detected by the AC current detection circuit 51 is equal to or higher than the current threshold. Furthermore, the PWM pulse generator 43 temporarily stops outputting the PWM pulse when the output of the PWM pulse is not stopped, and when the overcurrent flag is input thereto from the overcurrent detection circuit 52. Accordingly, the misconnection determiner 53 can easily acquire information indicating that the overcurrent state has been detected by the overcurrent detection circuit 52 by the overcurrent flag indicating the overcurrent state input thereto. Furthermore, the PWM pulse generator 43 temporarily stops outputting the PWM pulse when the overcurrent flag is input thereto such that the power conversion controller 60 can restart the operation of the DC/AC converter 13 unlike a case in which the PWM pulse generator 43 continuously stops outputting the PWM pulse when the overcurrent flag is input thereto from the overcurrent detection circuit 52.

According to the first embodiment, as described above, the PWM pulse generator 43 restarts the stopped output of the PWM pulse when the overcurrent flag is no longer input thereto from the overcurrent detection circuit 52. Accordingly, the power conversion controller 60 can reliably restart the operation of the DC/AC converter 13 when an overcurrent momentarily occurs, and thus stopping of the power converter 100 due to the momentary overcurrent can be significantly reduced or prevented.

According to the first embodiment, as described above, the power conversion controller 60 is configured to determine that the output terminal 16 is misconnected to the system power supply 105 when the voltage detected by the AC voltage detection circuit 41 is equal to or higher than the predetermined second voltage threshold before controlling power conversion in the DC/AC converter 13. Accordingly, the power conversion controller 60 can determine whether or not the output terminal 16 is misconnected to the system power supply 105 before operating the DC/AC converter 13. Consequently, unlike a case in which the power conversion controller 60 operates the DC/AC converter 13 and determines whether or not the output terminal 16 is misconnected to the system power supply 105, no overcurrent flows through the DC/AC converter 13, and thus damage to the switching elements 13a etc. of the DC/AC converter 13 due to misconnection to the system power supply 105 can be prevented.

Second Embodiment

The configuration of a power converter 200 according to a second embodiment is now described with reference to FIG. 6. In the figures, the same or similar configurations as those of the power converter 100 according to the first embodiment are denoted by the same reference numerals.

Figure 6:
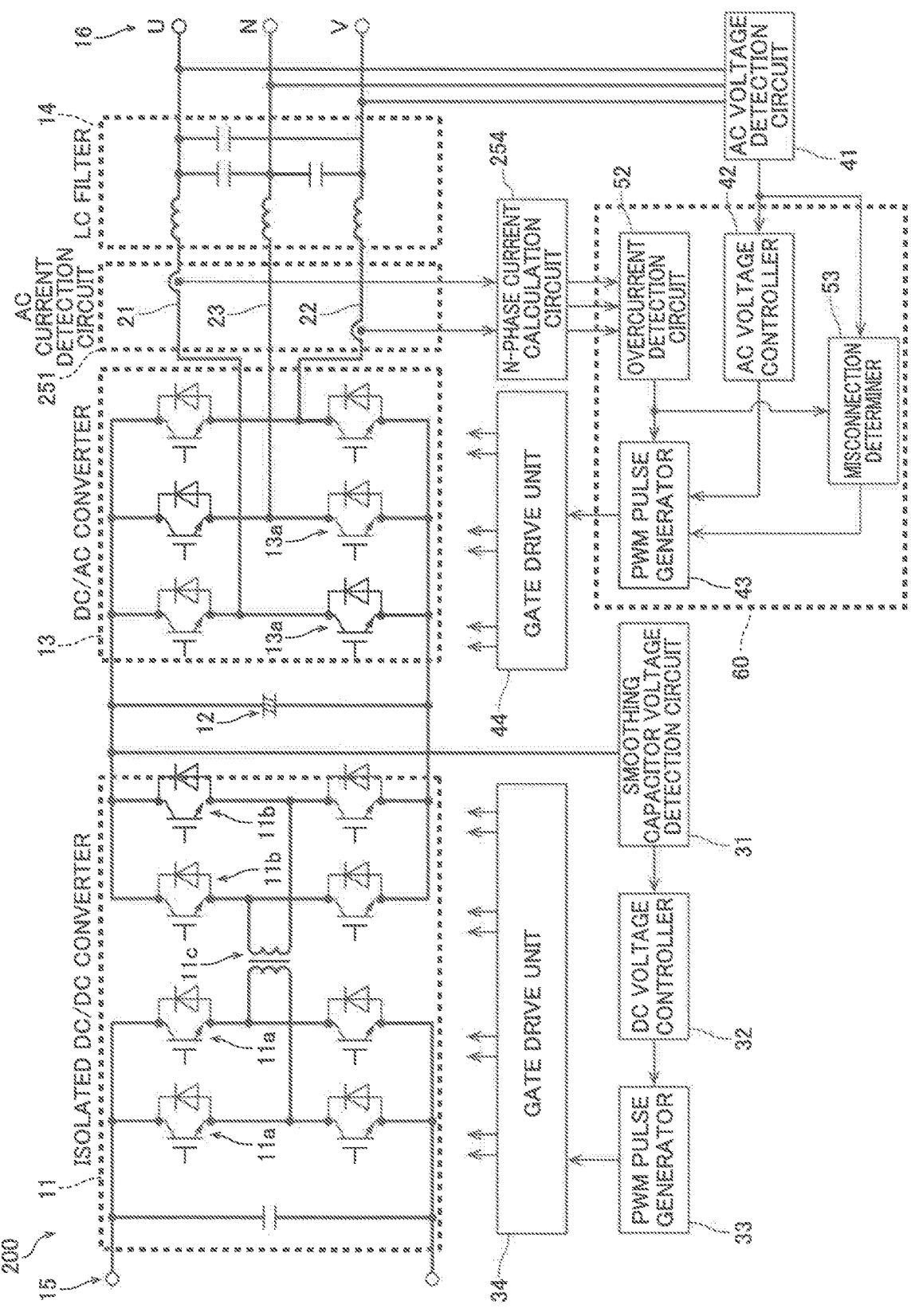
FIG. 6 is a diagram showing the overall configuration of a power converter according to a second embodiment of the present invention.

As shown in FIG. 6, the power converter 200 includes a power conversion controller 60 similarly to the power converter 100. The power conversion controller 60 is configured to determine whether or not an output terminal 16 is misconnected to a system power supply 105 based on an AC current and an AC voltage, and to perform a control to stop power conversion in a DC/AC converter 13 when determining that the output terminal 16 is misconnected to the system power supply 105.

In the second embodiment, the power converter 200 includes an AC current detection circuit 251 and an N-phase current calculation circuit 254. The N-phase current calculation circuit 254 is an example of a "current calculator" in the claims.

The AC current detection circuit 251 detects an AC current in a first voltage line 21 (U phase) and an AC current in a second voltage line 22 (V phase) (AC currents in the two lines). The AC current detection circuit 251 outputs the detected AC currents in the two lines to the N-phase current calculation circuit 254. In the AC current detection circuit 251, a detection circuit that detects an AC current in a neutral line 23 is not provided.

The N-phase current calculation circuit 254 calculates the AC current in the neutral line 23 based on the AC current in the first voltage line 21 and the AC current in the second voltage line 22 input from the AC current detection circuit 251. The N-phase current calculation circuit 254 includes an inverting adder circuit, for example, and inputs the AC current in the first voltage line 21 and the AC current in the second voltage line 22 to the inverting adder circuit to calculate the AC current in the neutral line 23. The N-phase current calculation circuit 254 outputs the AC current in the first voltage line 21 and the AC current in the second voltage line 22 input from the AC current detection circuit 251, and the calculated AC current in the neutral line 23 to an overcurrent detection circuit 52. Although FIG. 6 shows an example in which the N-phase current calculation circuit 254 is provided separately from the power conversion controller 60, the N-phase current calculation circuit 254 may be included as a component of the power conversion controller 60 in the power conversion controller 60.

The remaining configurations of the second embodiment are similar to those of the first embodiment.

[Advantageous Effects of Second Embodiment]

According to the second embodiment, the following advantageous effects are achieved.

According to the second embodiment, as described above, similarly to the power converter 100 according to the first embodiment, the power conversion controller 60 configured to control power conversion in the DC/AC converter 13 is configured to determine whether or not the output terminal 16 is misconnected to the system power supply 105, and to perform a control to stop power conversion in the DC/AC converter 13 when determining that the output terminal 16 is misconnected to the system power supply 105. Accordingly, similarly to the first embodiment, the possibility that a state in which the output terminal 16 is misconnected to the system power supply 105 and an overcurrent flows through the DC/AC converter 13 is maintained can be significantly reduced or prevented. Consequently, similarly to the first embodiment, damage to switching elements 13a etc. of the DC/AC converter 13 due to misconnection to the system power supply 105 can be significantly reduced or prevented.

According to the second embodiment, as described above, the DC/AC converter 13 outputs single-phase AC power via three lines including the first voltage line 21, the second voltage line 22, and the neutral line 23. Furthermore, the power converter 200 includes the AC current detection circuit 251, and the AC current detection circuit 251 detects the current in the first voltage line 21 and the current in the second voltage line 22 between the DC/AC converter 13 and the output terminal 16. Moreover, the power converter 200 includes the N-phase current calculation circuit 254 that calculates the current in the neutral line 23 based on the current in the first voltage line 21 and the current in the second voltage line 22. Accordingly, the current in the neutral line 23 can be calculated by the N-phase current calculation circuit 254 without providing a detection circuit that detects the current in the neutral line 23, and thus as compared with a case in which a detection circuit is provided for each of the three lines in the AC current detection circuit 251, the number of components can be reduced, and the device configuration can be simplified.

The remaining advantageous effects of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the power conversion controller 60 is configured to determine that the output terminal 16 is misconnected to the system power supply 105 when a voltage detected by an AC voltage detection circuit 41 (voltage detector) is equal to or higher than a predetermined second voltage threshold before controlling power conversion in the DC/AC converter 13 (power converter) in each of the aforementioned first and second embodiments, the present invention is not restricted to this. In the present invention, the power conversion controller may alternatively be configured not to determine whether or not the output terminal is misconnected to the system power supply before controlling power conversion in the power converter.

While the power conversion controller 60 is configured to output, to the control device 103, the misconnection flag indicating that the output terminal 16 is misconnected to the system power supply 105 when determining that the output terminal 16 is misconnected to the system power supply 105 in each of the aforementioned first and second embodiments, the present invention is not restricted to this. In the present invention, for example, when determining that the output terminal is misconnected to the system power supply, the misconnection determiner may alternatively output the misconnection flag indicating that the output terminal is misconnected to the system power supply directly to the display device of the vehicle (electric vehicle) on which the power converter is mounted without going through the control device, may alternatively output the misconnection flag to an operation unit (operation panel) of the vehicle (electric vehicle) on which the power converter is mounted, or may alternatively output the misconnection flag to a control device or display device, for example, provided in the house to which the AC power converted by the power converter is supplied.

While the misconnection determiner 53 outputs the misconnection flag indicating that the output terminal 16 is misconnected to the system power supply 105 to the PWM pulse generator 43 (PWM signal generator) when determining that the output terminal 16 is misconnected to the system power supply 105, and the PWM pulse generator 43 stops outputting the PWM pulse (PWM signal) when the misconnection flag is input thereto in each of the aforementioned first and second embodiments, the present invention is not restricted to this. In the present invention, for example, the misconnection determiner may alternatively output the misconnection flag indicating that the output terminal is misconnected to the system power supply to the gate drive unit when determining that the output terminal is misconnected to the system power supply, and the gate drive unit may alternatively stop outputting the gate pulse when the misconnection flag is input thereto.

While the power converter 100 (200) includes the isolated DC/DC converter 11 in each of the aforementioned first and second embodiments, the present invention is not restricted to this. In the present invention, the power converter may alternatively include a non-isolated DC/DC converter.

While the power converter 100 (200) is mounted on the electric vehicle 101 in each of the aforementioned first and second embodiments, the present invention is not restricted to this. In the present invention, the power converter may alternatively be mounted on a fuel-cell car.

While the power converter 100 (200) is a power converter capable of bi-directionally converting power between the input terminal 15 side and the output terminal 16 side in each of the aforementioned first and second embodiments, the present invention is not restricted to this. In the present invention, like a power converter that converts power generated by solar power and supplies the power to a load in a house, the power converter may alternatively be a power converter capable of converting power in one direction from the input terminal side to the output terminal side, for example.

What is claimed is:

1. A power converter configured to supply power from a DC power supply to a load in a house, the power converter comprising:
   a power converter device including a plurality of switching elements, the power converter device converting DC power input from the DC power supply and outputting AC power;
   a voltage detector that detects a voltage between the power converter device and an output terminal;
   a current detector that detects a current between the power converter device and the output terminal; and
   a power conversion controller configured to control power conversion in the power converter device based on the voltage detected by the voltage detector and the current detected by the current detector, wherein
   the power conversion controller is configured to determine whether or not the output terminal is misconnected to a system power supply based on the current detected by the current detector and the voltage detected by the voltage detector, and to perform a control to stop the power conversion in the power converter device when determining that the output terminal is misconnected to the system power supply, and
   the power conversion controller includes:
   an overcurrent detector that detects that the current detected by the current detector is in an overcurrent state, and
   a misconnection determiner that determines whether or not the output terminal is misconnected to the system power supply based on the overcurrent state detected by the overcurrent detector and the voltage detected by the voltage detector.

2. The power converter according to claim 1, wherein the power conversion controller further includes:
   a PWM signal generator that generates and outputs a PWM signal to control the power conversion;
   wherein the PWM signal generator stops outputting the PWM signal when the misconnection determiner determines that the output terminal is misconnected to the system power supply.

3. The power converter according to claim 2, wherein
   the overcurrent detector outputs overcurrent information indicating the overcurrent state to the misconnection determiner and the PWM signal generator when the current detected by the current detector is equal to or higher than a predetermined current threshold; and
   the PWM signal generator temporarily stops outputting the PWM signal when an output of the PWM signal is not stopped, and when the overcurrent information is input thereto from the overcurrent detector.

4. The power converter according to claim 3, wherein the PWM signal generator restarts the output of the PWM signal when the overcurrent information is no longer input thereto from the overcurrent detector.

5. The power converter according to claim 1, wherein the misconnection determiner determines that the output terminal is misconnected to the system power supply when the overcurrent state repeatedly occurs for a plurality of times during a predetermined period, and when the voltage detected by the voltage detector continues to be higher than a predetermined first voltage threshold over the predetermined period.

6. The power converter according to claim 1, wherein the power conversion controller is configured to determine that the output terminal is misconnected to the system power supply when the voltage detected by the voltage detector is equal to or higher than a predetermined second voltage threshold before controlling the power conversion in the power converter device.

7. The power converter according to claim 1, wherein
   the power converter device outputs single-phase AC power via three lines including a first voltage line, a second voltage line, and a neutral line;
   the current detector detects a current in the first voltage line and a current in the second voltage line between the power converter device and the output terminal; and
   the power converter device further comprises a current calculator that calculates a current in the neutral line based on the current in the first voltage line and the current in the second voltage line.

* * * * *